United States Patent
Tanaka et al.

(10) Patent No.: US 11,655,321 B2
(45) Date of Patent: May 23, 2023

(54) MODIFIED CONJUGATED DIENE-BASED POLYMER, RUBBER COMPOSITION, TIRE, AND METHOD OF PRODUCING MODIFIED CONJUGATED DIENE-BASED POLYMER

(71) Applicant: BRIDGESTONE CORPORATION, Tokyo (JP)

(72) Inventors: Takatsugu Tanaka, Kokubunji (JP); Rika Fukushima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 537 days.

(21) Appl. No.: 16/640,798

(22) PCT Filed: Aug. 31, 2018

(86) PCT No.: PCT/JP2018/032401
§ 371 (c)(1),
(2) Date: Feb. 21, 2020

(87) PCT Pub. No.: WO2019/045053
PCT Pub. Date: Mar. 7, 2019

(65) Prior Publication Data
US 2021/0115175 A1  Apr. 22, 2021

(30) Foreign Application Priority Data

Sep. 1, 2017 (JP) .............................. JP2017-168665
May 14, 2018 (JP) .............................. JP2018-092912

(51) Int. Cl.
*C08F 236/10* (2006.01)
*C08K 3/04* (2006.01)
*B60C 1/00* (2006.01)

(52) U.S. Cl.
CPC .............. *C08F 236/10* (2013.01); *B60C 1/00* (2013.01); *C08K 3/04* (2013.01)

(58) Field of Classification Search
CPC ............ C08K 3/04; B60C 1/00; C08F 236/10
USPC ........................................................ 524/572
See application file for complete search history.

(56) References Cited

U.S. PATENT DOCUMENTS

| | | | |
|---|---|---|---|
| 3,492,369 A | 1/1970 | Naylor | |
| 3,886,127 A | 5/1975 | Furukawa et al. | |
| 3,976,628 A | 8/1976 | Halasa et al. | |
| 4,417,029 A | 11/1983 | Milkovich | |
| 4,742,124 A | 5/1988 | Tsutsumi et al. | |
| 8,410,224 B2 | 4/2013 | Matsumoto et al. | |
| 2002/0183468 A1 | 12/2002 | Graves et al. | |
| 2003/0069365 A1 | 4/2003 | Grun et al. | |
| 2003/0195288 A1 | 10/2003 | Robert et al. | |
| 2008/0161448 A1 | 7/2008 | DeDecker | |
| 2011/0160388 A1 | 6/2011 | Tanaka et al. | |

FOREIGN PATENT DOCUMENTS

| | | |
|---|---|---|
| CN | 1923901 A | 3/2007 |
| CN | 102083889 A | 6/2011 |
| CN | 103408679 A | 11/2013 |
| GB | 1 253 919 A | 11/1971 |
| JP | 47-044351 B1 | 11/1972 |
| JP | 50-053493 A | 5/1975 |
| JP | 52-066597 A | 6/1977 |
| JP | 60-255838 A | 12/1985 |
| JP | 62-207342 A | 9/1987 |
| JP | 07-292159 A | 11/1995 |
| JP | 3457379 B2 * | 10/2003 |
| JP | 2003-534426 A | 11/2003 |
| JP | 2004-525232 A | 8/2004 |
| JP | 2004-538343 A | 12/2004 |
| JP | 2008-143952 A | 6/2008 |
| JP | 2008-143953 * | 6/2008 |
| JP | 2009-161648 A | 7/2009 |
| JP | 2010-185053 A | 8/2010 |
| JP | 2013-249379 A | 12/2013 |
| JP | 2014-227458 A | 12/2014 |
| JP | 2016-003246 A | 1/2016 |
| WO | 2014/032803 A1 | 3/2014 |

OTHER PUBLICATIONS

International Search Report for PCT/JP2018/032401 dated Nov. 13, 2018 (PCT/ISA/210).
Search Report dated Sep. 3, 2021 from the State Intellectual Property Office of the P.R. of China in Application No. 2018800550991.
Extended European Search Report dated May 27, 2021, issued by the European Patent Office in application No. 18852581.0.
International Preliminary Report on Patentability with a Translation of Written Opinion in International Application No. PCT/JP2018/032401, dated Mar. 3, 2020.

* cited by examiner

*Primary Examiner* — Deve V Hall
(74) *Attorney, Agent, or Firm* — Sughrue Mion, PLLC

(57) ABSTRACT

Provided is a modified conjugated diene-based polymer, a rubber composition and a tire with excellent low loss property and durability, and a method of producing a modified conjugated diene-based polymer with which the presently disclosed modified conjugated diene-based polymer can be produced. The modified conjugated diene-based polymer has two or more modifying groups in one modified conjugated diene-based polymer molecule, where the modifying groups between molecules have a non-covalent bond with energy of 10 kJ/mol to 250 kJ/mol. The rubber composition contains the modified conjugated diene-based polymer. The tire uses the rubber composition. The method of producing a modified conjugated diene-based polymer includes (i) anionically polymerizing at least a conjugated diene compound in presence of an alkali metal compound to form a conjugated diene-based polymer, (ii) further adding an alkali metal compound to the conjugated diene-based polymer, and (iii) reacting the product obtained in (ii) with a modifying agent to introduce a modifying group into the conjugated diene-based polymer.

13 Claims, No Drawings

MODIFIED CONJUGATED DIENE-BASED POLYMER, RUBBER COMPOSITION, TIRE, AND METHOD OF PRODUCING MODIFIED CONJUGATED DIENE-BASED POLYMER

CROSS REFERENCE TO RELATED APPLICATIONS

This application is a National Stage of International Application No. PCT/JP2018/032401 filed Aug. 31, 2018, claiming priority based on Japanese Patent Application No. 2017-168665 filed Sep. 1, 2017 and Japanese Patent Application No. 2018-092912 filed May 14, 2018.

TECHNICAL FIELD

This disclosure relates to a modified conjugated diene-based polymer, a rubber composition, a tire, and a method of producing a modified conjugated diene-based polymer.

BACKGROUND

In recent years, demands for reducing automobile fuel consumption have been more severe. To respond to such demands, tires are required to have low rolling resistance. The most common method of reducing the rolling resistance of a tire is to use a material with low heat generation (low loss property) as a rubber composition.

Examples of such a method include a method of using carbon black as a filler and modifying a polymerization active terminal with a tin compound (e.g. see JP S60-255838 A (PTL 1)), and a method of also using carbon black to introduce an amino group to a polymerization active terminal (e.g. see JP S62-207342 A (PTL 2)).

CITATION LIST

Patent Literature

PTL 1: JP S60-255838 A
PTL 2: JP S62-207342 A

SUMMARY

Technical Problem

However, in a polymer material, the energy transferred to destruction generally increases as the hysteresis loss decreases, which deteriorates the strength (durability).

It could thus be helpful to provide a modified conjugated diene-based polymer with excellent low loss property and durability. In addition, it could be helpful to provide a rubber composition with excellent low loss property and durability. Further, it could be helpful to provide a tire with excellent low loss property and durability. Moreover, it could be helpful to provide a method of producing a modified conjugated diene-based polymer, which can produce a modified conjugated diene-based polymer with excellent low loss property and durability.

Solution to Problem

The modified conjugated diene-based polymer of the present disclosure has two or more modifying groups in one molecule of the modified conjugated diene-based polymer, where the modifying groups between molecules have a non-covalent bond, and energy for one non-covalent bond is 10 kJ/mol to 250 kJ/mol.

The modified conjugated diene-based polymer of the present disclosure is excellent in low loss property and durability.

The rubber composition of the present disclosure contains any one of the above-described modified conjugated diene-based polymers.

The rubber composition of the present disclosure is excellent in low loss property and durability.

The tire of the present disclosure uses any one of the above-described rubber compositions.

The tire of the present disclosure is excellent in low loss property and durability.

The method of producing a modified conjugated diene-based polymer of the present disclosure includes:

(i) anionically polymerizing a conjugated diene compound alone or a conjugated diene compound and an aromatic vinyl compound in presence of an alkali metal compound as a polymerization initiator to form a conjugated diene-based polymer, (ii) further adding an alkali metal compound to the conjugated diene-based polymer after (i) to obtain a product, and (iii) reacting the product obtained in (ii) with a modifying agent to introduce a modifying group into the conjugated diene-based polymer.

According to the method of producing a modified conjugated diene-based polymer of the present disclosure, it is possible to obtain a modified conjugated diene-based polymer with excellent low loss property and durability.

Advantageous Effect

According to the present disclosure, it is possible to provide a modified conjugated diene-based polymer with excellent low loss property and durability. In addition, it is possible to provide a rubber composition with excellent low loss property and durability. Further, it is possible to provide a tire with excellent low loss property and durability. Moreover, it is possible to provide a method of producing a modified conjugated diene-based polymer, which can produce a modified conjugated diene-based polymer with excellent low loss property and durability.

DETAILED DESCRIPTION

The following describes embodiments of the present disclosure. It should be noted that the descriptions given below are illustrative purposes only and shall not be construed as limiting the scope of the present disclosure.

In the present disclosure, two or more embodiments can be optionally combined.

In the present disclosure, the energy for one non-covalent bond between the modifying groups of the modified conjugated diene-based polymer is determined by a quantum chemistry calculation program using Gaussian 09, where M06/6-31G (d, p) is used as a basis function. The bonding energy is calculated as follows. First, only monomer units forming the non-covalent bond are taken out, a model of association state is prepared, and the energy of the association state is calculated. Next, the association state is sufficiently dissociated, and the energy of the dissociation state is calculated. From the difference between the energy of the association state and the energy of the dissociation state, the bonding energy for one molecule is obtained, and it is divided by the number of coordinate bonds to obtain the bonding energy for one bond.

In the present disclosure, the weight-average molecular weight (Mw) is obtained by preparing a calibration curve from monodisperse polystyrene by gel permeation chromatography (GPC: HLC-8020 made by Tosoh Corporation, column: GMH-XL made by Tosoh Corporation (two in series), detector: differential refractometer (RI)) and determining the weight-average molecular weight (Mw) in terms of polystyrene of each modified conjugated diene-based polymer. In the case of using a modifying agent, the weight-average molecular weight in terms of polystyrene before reacting the modifying agent with a polymerization active terminal is obtained by adding an appropriate amount of deaerated isopropanol to the polymerization reaction system before adding the modifying agent to stop the polymerization reaction, adding 0.5 mL of an isopropanol solution of 2,6-di-t-butyl-p-cresol (BHT) (BHT concentration: 5 mass %), performing isolation according to a conventional method, and measuring the weight-average molecular weight of the resulting modified conjugated diene-based polymer.

(Modified Conjugated Diene-Based Polymer)

The modified conjugated diene-based polymer of the present disclosure has two or more modifying groups in one molecule of the modified conjugated diene-based polymer, where the modifying groups between molecules have a non-covalent bond, and energy for one non-covalent bond is 10 kJ/mol to 250 kJ/mol.

The modified conjugated diene-based polymer of the present disclosure is excellent in low loss property and durability. Without wishing to be bound by theory, it is presumed that the reason is as follows. The modifying groups between molecules have a non-covalent bond where the bonding energy is weak and is within the above-specified range. Therefore, in a crosslinked product of the modified conjugated diene-based polymer, the non-covalent bond is maintained at low strain, which leads to excellent low loss property, and on the other hand, the non-covalent bond is cut and loss occurs at high strain, which leads to excellent durability.

In addition, the modified conjugated diene-based polymer of the present disclosure also improves the wet gripping performance. Without wishing to be bound by theory, it is presumed that the reason is as follows. It is generally considered that a rubber containing a crosslinked product of the modified conjugated diene-based polymer greatly deforms during gripping. The non-covalent bond is broken during the deformation, and the resulting energy loss not only improves the durability but also improves the wet gripping performance.

In the modified conjugated diene-based polymer of the present disclosure, the energy for one non-covalent bond is preferably 50 kJ/mol to 250 kJ/mol from the viewpoint of obtaining excellent low loss property and durability.

In one embodiment, the energy for one non-covalent bond is 60 kJ/mol or more, 100 kJ/mol or more, 150 kJ/mol or more, 160 kJ/mol or more, 170 kJ/mol or more, 180 kJ/mol or more, 190 kJ/mol or more, 200 kJ/mol or more, 210 kJ/mol or more, 220 kJ/mol or more, 230 kJ/mol or more, or 240 kJ/mol or more. In another embodiment, the energy for one non-covalent bond is 240 kJ/mol or less, 230 kJ/mol or less, 220 kJ/mol or less, 210 kJ/mol or less, 200 kJ/mol or less, 190 kJ/mol or less, 180 kJ/mol or less, 170 kJ/mol or less, 160 kJ/mol or less, or 150 kJ/mol or less.

(Method of Producing Modified Conjugated Diene-Based Polymer)

The method of producing a modified conjugated diene-based polymer of the present disclosure includes:

(i) anionically polymerizing a conjugated diene compound alone or a conjugated diene compound and an aromatic vinyl compound in presence of an alkali metal compound as a polymerization initiator to form a conjugated diene-based polymer, (ii) further adding an alkali metal compound to the conjugated diene-based polymer after (i) to obtain a product, and (iii) reacting the product obtained in (ii) with a modifying agent to introduce a modifying group into the conjugated diene-based polymer. The method of producing a modified conjugated diene-based polymer of the present disclosure can be suitably used to obtain the above-described modified conjugated diene-based polymer of the present disclosure.

The step of (i) anionically polymerizing a conjugated diene compound alone or a conjugated diene compound and an aromatic vinyl compound in presence of an alkali metal compound as a polymerization initiator to form a conjugated diene-based polymer (hereinafter may be simply referred to as step (i)) can be performed in the same manner as the conventionally known anionic polymerization described in, for example, JP 2013-249379 A, JP 2016-003246 A, and JP 2014-227458 A.

Examples of the conjugated diene compound used in the step (i) include 1,3-butadiene, isoprene, 1,3-pentadiene, and 2,3-dimethylbutadiene. In one embodiment, the conjugated diene compound has 4 to 8 carbon atoms. The conjugated diene compound may be used alone or in combination of two or more.

In one embodiment, the conjugated diene compound is at least one selected from the group consisting of 1,3-butadiene and isoprene. In another embodiment, the conjugated diene compound is only 1,3-butadiene.

In the present disclosure, the compound including at least the conjugated diene compound used for forming the conjugated diene-based polymer in the step (i) (the aromatic vinyl compound and the non-conjugated olefin described later are optionally included) may be collectively referred to as the monomer.

In the step (i), when a conjugated diene compound and an aromatic vinyl compound are copolymerized, the content of the conjugated diene unit (moieties derived from the conjugated diene compound) in the resulting modified conjugated diene-based polymer is not particularly limited. For example, it may be 20 mol % or more, 40 mol % or more, 60 mol % or more, 80 mol % or more, 90 mol % or more, or 95 mol % or more, and 95 mol % or less, 90 mol % or less, 80 mol % or less, 60 mol % or less, 40 mol % or less, or 20 mol % or less. In one embodiment, the content of the conjugated diene unit in the modified conjugated diene-based polymer is 50 mol % to 100 mol %.

Examples of the aromatic vinyl compound that can be used in the step (i) include styrene, alkylstyrene, and halogenated alkylstyrene. The aromatic vinyl compound may be used alone or in combination of two or more.

The alkyl group of the alkylstyrene may have, for example, 1 to 5 carbon atoms. Examples of the alkylstyrene include 4-methylstyrene, 3-methylstyrene, and 2,4-dimethylstyrene.

The alkyl group of the halogenated alkylstyrene may have, for example, 1 to 5 carbon atoms. Examples of the halogen of the halogenated alkylstyrene include fluorine, chlorine, bromine, and iodine. Examples of the halogenated alkylstyrene include 4-chloromethylstyrene and 3-chloromethylstyrene.

In the method of producing a modified conjugated diene-based polymer of the present disclosure, the aromatic vinyl compound preferably contains styrene and at least one selected from the group consisting of alkylstyrene and halogenated alkylstyrene. This makes it easier to introduce a modifying group.

In the method of producing a modified conjugated diene-based polymer of the present disclosure, the total content of the at least one selected from the group consisting of alkylstyrene and halogenated alkylstyrene is preferably 0.1 mass % to 3 mass % with respect to the monomer forming the conjugated diene-based polymer. In this way, it is possible to obtain excellent low loss property and durability while guaranteeing the operability during production.

In the method of producing a modified conjugated diene-based polymer of the present disclosure, the alkylstyrene is preferably 4-methylstyrene, and the halogenated alkylstyrene is preferably 4-chloromethylstyrene. This makes it easier to introduce a modifying group.

In the step (i), when a conjugated diene compound and an aromatic vinyl compound are copolymerized, the content of the aromatic vinyl unit (moieties derived from the aromatic vinyl compound) in the resulting modified conjugated diene-based polymer is not particularly limited. For example, it may be 0.1 mol % or more, 1 mol % or more, 5 mol % or more, 10 mol % or more, 20 mol % or more, 30 mol % or more, or 40 mol % or more, and 50 mol % or less, 45 mol % or less, 40 mol % or less, 30 mol % or less, 20 mol % or less, 10 mol % or less, 5 mol % or less, 1 mol % or less, or 0.1 mol % or less. In one embodiment, the content of the aromatic vinyl unit in the modified conjugated diene-based polymer is 0 mol % to 50 mol %.

In the step (i), when a conjugated diene compound and an aromatic vinyl compound are copolymerized, a non-conjugated olefin may be copolymerized in addition to the conjugated diene compound and the aromatic vinyl compound. Examples of the non-conjugated olefin include ethylene, propylene, 1-butene, isobutene, 1-pentene, 1-hexene, 1-heptene, and 1-octene. In one embodiment, the non-conjugated olefin has 2 to 10 carbon atoms. The non-conjugated olefin may be used alone or in combination of two or more.

In one embodiment, the non-conjugated olefin is at least one selected from non-cyclic non-conjugated olefins, that is, at least one selected from linear non-conjugated olefins and branched non-conjugated olefins. In another embodiment, the non-conjugated olefin is an α-olefin. An α-olefin has a double bond at the a position of the olefin, which allows efficient copolymerization with a conjugated diene compound.

In one embodiment, the non-conjugated olefin is at least one selected from the group consisting of ethylene, propylene and 1-butene. In another embodiment, the non-conjugated olefin is only ethylene.

The alkali metal compound used as a polymerization initiator may be an alkali metal compound known for anionic polymerization. Examples of the alkali metal atom (M) include Li, Na, K, Rb, and Cs. Examples of the alkali metal compound include an organic alkali metal compound and an organic alkaline earth metal compound. The alkali metal compound is preferably an organic alkali metal compound.

Examples of the organic alkali metal compound include a hydrocarbyllithium and a lithium amide compound.

The hydrocarbyllithium preferably has, for example, a hydrocarbyl group with 2 to 20 carbon atoms, and examples thereof include ethyllithium, n-propyllithium, isopropyllithium, n-butyllithium, isobutyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclobentyllithium, and a reaction product of diisopropenylbenzene and butyllithium.

Examples of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, and lithium methylphenethylamide.

The alkali metal compound used in the step (i) is preferably n-butyllithium, because in this way, the modified conjugated diene-based polymer of the present disclosure can be synthesized more efficiently.

The amount of the alkali metal compound used in the step (i) may be appropriately adjusted, and it may be within the range of 0.2 mmol to 20 mmol with respect to 100 parts by mass of the monomer forming the modified conjugated diene-based polymer, for example.

In the step of (ii) further adding an alkali metal compound to the conjugated diene-based polymer after the step (i) (hereinafter may be simply referred to as step (ii)), examples of the alkali metal atom (M) of the added alkali metal compound include Li, Na, K, Rb, and Cs.

The alkali metal compound added in the step (ii) is the same as the alkali metal compound described in the step (i). The alkali metal compounds in the step (i) and the step (ii) may be the same or different.

The alkali metal compound used in the step (ii) is preferably sec-butyllithium, because in this way, the modified conjugated diene-based polymer of the present disclosure can be synthesized more efficiently.

The alkali metal compound used in the step (i) is preferably n-butyllithium and the alkali metal compound used in the step (ii) is preferably sec-butyllithium, because in this way, the modified conjugated diene-based polymer of the present disclosure can be synthesized more efficiently.

By further adding an alkali metal compound separately in the step (ii) after the step (i), an alkali metal atom is introduced into a portion other than one terminal of the polymer main chain (such as in the middle of the polymer main chain) of the conjugated diene-based polymer formed in the step (i) (the hydrogen atom of the hydrocarbon chain is replaced with the alkali metal atom), and the introduced alkali metal atom reacts with the modifying agent to introduce a modifying group that can form a non-covalent bond between molecules.

However, in the case where the alkali metal compound is added at one time in the step (i) in an amount including the amount to be added in the step (ii), without adding any more alkali metal compound, that is, without performing the step (ii), for example, it only increases the reaction starting point of the anionic polymerization during the formation of the conjugated diene-based polymer and reduces the molecular weight of the conjugated diene-based polymer, and no alkali metal atom is introduced into a portion other than one terminal of the polymer main chain of the conjugated diene-based polymer as described above. As a result, even if the conjugated diene-based polymer in which only one terminal is introduced with an alkali metal compound is reacted with a modifying agent to introduce a modifying group, it is difficult to obtain two or more modifying groups. Accordingly, it is difficult to obtain the above-described modified conjugated diene-based polymer of the present disclosure.

Therefore, in order to introduce an alkali metal atom that can react with a modifying agent into a portion other than one terminal of the polymer main chain of the conjugated diene-based polymer formed in the step (i), it is necessary to further add an alkali metal compound after the step (i).

For example, when styrene is used as the aromatic vinyl compound, the portion into which the alkali metal atom is introduced in the step (ii) is a tertiary carbon atom of the bonding portion of the styrene with the polymer main chain. For another example, when styrene and 4-methylstyrene are used as the aromatic vinyl compound, the alkali metal atom is introduced into a tertiary carbon atom of the bonding portion of the 4-methylstyrene with the polymer main chain and a primary carbon atom of the 4-position methyl group, in addition to a tertiary carbon atom of the bonding portion of the styrene with the polymer main chain. In this case, steric hindrance is smaller in the primary carbon atom than in the tertiary carbon atom, and therefore it is considered that the alkali metal atom be preferentially introduced into the primary carbon atom. In addition, it is considered that, in a polymer system where no aromatic vinyl compound is contained and the activity is inferior to the case of containing an aromatic vinyl compound, an allyl-position hydrogen atom reacts with the alkali metal atom of the alkali metal compound added later to introduce an alkali metal atom.

The amount of the alkali metal compound added in the step (ii) may be appropriately adjusted. For example, it may be within the range of 0.2 mmol to 20 mmol with respect to 100 parts by mass of the monomer forming the modified conjugated diene-based polymer.

The ratio between the amount (mmol) of the alkali metal compound added in the step (i) and the amount (mmol) of the alkali metal compound added in the step (ii) ((ii)/(i)) is preferably 0.5 to 100, and more preferably 0.9 to 20.

In the case where the aromatic vinyl compound contains styrene and at least one selected from the group consisting of alkylstyrene and halogenated alkylstyrene, the amount of the alkali metal compound added in the step (ii) may be in the range of 0.1 mass % to 3 mass % and preferably 0.1 mass % to 1 mass % with respect to the monomer forming the modified conjugated diene-based polymer, for example. In this way, it is possible to obtain excellent low loss property and durability while guaranteeing the operability.

In the step of (iii) reacting the product obtained in (ii) with a modifying agent to introduce a modifying group into the conjugated diene-based polymer (hereinafter may be simply referred to as step (iii)), the modifying agent used may be, for example, carbon dioxide or carbon disulfide.

In the method of producing a modified conjugated diene-based polymer of the present disclosure, the modifying agent is preferably carbon dioxide. In this way, a polar group can be easily introduced into a nonpolar polymer.

The amount of the modifying agent may be appropriately adjusted and is not particularly limited. For example, when carbon dioxide is used as the modifying agent, carbon dioxide may be blown into the solution containing the product of the step (ii) until the color of the solution disappears.

For example, when carbon dioxide is used as the modifying agent, the modifying group is —COOM. For example, when an aldehyde such as acetaldehyde is used as the modifying agent, the modifying group is —OM.

In the modified conjugated diene-based polymer of the present disclosure, the modifying group is preferably at least one selected from the group consisting of —COOM and —OM (M is an alkali metal atom). In this way, a coordination bond having appropriate bonding energy can be introduced.

In the modified conjugated diene-based polymer of the present disclosure, the modifying group is preferably at least one selected from the group consisting of —COOLi and —OLi. In this way, a coordination bond having appropriate bonding energy can be introduced.

The modified conjugated diene-based polymer of the present disclosure has two or more modifying groups for one molecule. From the viewpoint of further improving the low loss property and the durability, the number of modifying groups for one molecule is preferably three or more. From the viewpoint of ease of handling, the number of modifying groups for one molecule is preferably 30 or less.

The following scheme is a scheme illustrating an example of the steps (i) to (iii), in the case where butadiene is used as the conjugated diene compound, styrene and 4-methylstyrene are used as the aromatic vinyl compound, n-butyllithium is used as the alkali metal compound in the step (i), sec-butyllithium is used as the alkali metal compound in the step (ii), and carbon dioxide is used as the modifying agent in the step (iii). For the sake of simplicity, this example illustrates an intermediate product in which only a 4-position methyl portion of the 4-methylstyrene unit of the conjugated diene-based polymer is introduced with a Li atom in the step (ii). However, the Li atom may be introduced into the carbon atoms marked with * in the formula, that is, the tertiary carbon atom of the bonding portion of the styrene with the polymer main chain and the tertiary carbon atom of the bonding portion of the 4-methylstyrene with the polymer main chain.

[Formula 1]

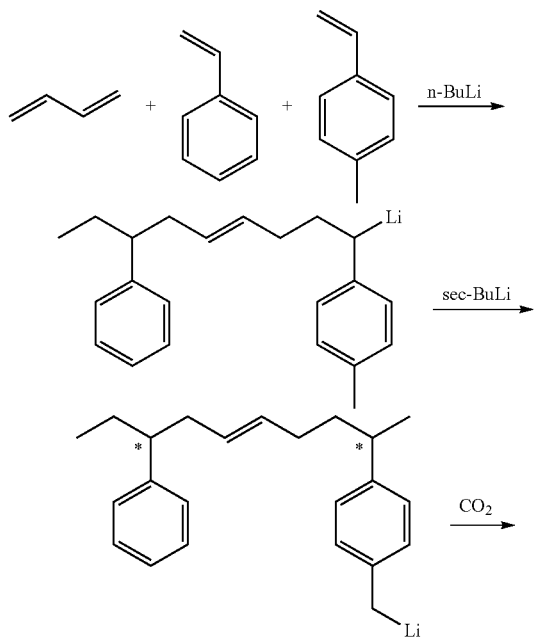

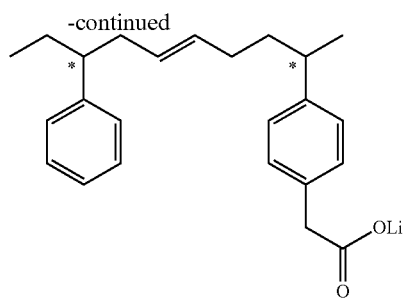

The modified conjugated diene-based polymer obtained in the above example has —COOLi as a modifying group, and, for example, the O atom of the carbonyl group in the modifying group coordinates to the Li atom in the modifying group of another modified conjugated diene-based polymer molecule to form a coordinate bond that is a kind of non-covalent bond. Since the Li atom has a coordination number of four, the O atom of the carbonyl group of the modifying group in two more modified conjugated diene-based polymer molecules can coordinate to the Li atom.

In the method of producing a modified conjugated diene-based polymer of the present disclosure, the step (ii) and the step (iii) may be performed simultaneously, or the step (iii) may be performed after the step (ii)

The method of producing a modified conjugated diene-based polymer of the present disclosure may include, for example, a step of cleaning the modified conjugated diene-based polymer obtained in the step (iii), in addition to the steps (i), (ii) and (iii). The solvent used in the cleaning is not particularly limited and may be appropriately selected depending on the intended use. Examples of the solvent include methanol, ethanol, isopropanol, water, and buffer water.

In the present disclosure, it is preferable not to add an acid to the modified conjugated diene-based polymer. This is because adding an acid may remove lithium from the modified conjugated diene-based polymer so that the polymer may not have a coordinate bond.

The molecular weight of the modified conjugated diene-based polymer is not particularly limited and may be appropriately adjusted. For example, the weight-average molecular weight (Mw) of the modified conjugated diene-based polymer may be 100,000 or more or 150,000 or more, and 1,000,000 or less or 500,000 or less.

The modified conjugated diene-based polymer of the present disclosure preferably has a weight-average molecular weight of 100,000 or more. In this way, it is possible to achieve both excellent low loss property and excellent durability.

In the modified conjugated diene-based polymer of the present disclosure, the modified conjugated diene-based polymer is preferably at least one selected from the group consisting of a modified styrene-butadiene copolymer and a modified polybutadiene. In this way, it is possible to obtain more excellent low loss property and durability.

The modified conjugated diene-based polymer of the present disclosure may be used alone or in combination of two or more.

(Rubber Composition)

The rubber composition of the present disclosure contains any one of the above-described modified conjugated diene-based polymers. The modified conjugated diene-based polymer may be used alone or in combination of two or more.

The rubber composition of the present disclosure may or may not contain other rubber components in addition to the above-described modified conjugated diene-based polymer. Such other rubber components may be appropriately selected from known rubber components. Examples of the other rubber components include a natural rubber, a synthetic isoprene rubber, a butadiene rubber, a styrene-butadiene rubber, a butyl rubber, a bromide of copolymer of isobutylene and p-methylstyrene, a halogenated butyl rubber, an acrylonitrile-butadiene rubber, a chloroprene rubber, an ethylene-propylene rubber, an ethylene-propylene-diene rubber, a styrene-isoprene rubber, a styrene-isoprene-butadiene rubber, an isoprene-butadiene rubber, a chlorosulfonated polyethylene, an acrylic rubber, an epichlorohydrin rubber, a polysulfide rubber, a silicone rubber, a fluoro rubber, and a urethane rubber. These other rubber components may be used alone or in combination of two or more.

<Other Components>

In addition to the above-described modified conjugated diene-based polymer and other rubber components that can optionally be contained, the rubber composition of the present disclosure may be appropriately compounded with additives that are known to be compounded in a rubber composition. Examples of such additives include a filler, a vulcanizing agent (crosslinking agent), a vulcanization accelerator, an age resistor, a reinforcing agent, a softening agent, a vulcanizing co-agent, a colorant, a flame retardant, a lubricant, a foaming agent, a plasticizer, a processing aid, an antioxidant, an anti-scorch agent, an ultraviolet rays protecting agent, an antistatic agent, a color protecting agent, and oil. These additives may be used alone or in combination of two or more.

The rubber composition of the present disclosure preferably further contains a filler. In this way, it is possible to obtain more excellent low loss property and durability. In addition, this also improves the wet gripping performance.

<Filler>

Examples of the filler include an inorganic filler and carbon black. These may be used alone or in combination of two or more. In the present disclosure, carbon black is not included in inorganic fillers.

Examples of the inorganic filler include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate.

In the case of using an inorganic filler, the inorganic filler may be appropriately subjected to a surface treatment using, for example, a silane coupling agent.

Examples of the carbon black include those of GPF (General Purpose Furnace), FEF (Fast Extruding Furnace), SRF (Semi-Reinforcing Furnace), HAF (High Abrasion Furnace), SAF (Super Abrasion Furnace), ISAF (Intermediate SAF) grades.

When the rubber composition of the present disclosure contains a filler, the content thereof may be appropriately adjusted. For example, it may be 5 parts by mass to 200 parts by mass, 10 parts by mass to 200 parts by mass, or 10 parts by mass to 130 parts by mass with respect to 100 parts by mass of the rubber component.

<Vulcanizing Agent (Crosslinking Agent)>

The vulcanizing agent (crosslinking agent) is not particularly limited and may be appropriately selected. Examples of the vulcanizing agent (crosslinking agent) include a sulfur-containing crosslinking agent, an organic peroxide-based crosslinking agent, an inorganic crosslinking agent, a polyamine crosslinking agent, a resin crosslinking agent, a sulfur compound-based crosslinking agent, an oxime-nitrosamine-based crosslinking agent, and sulfur.

When the rubber composition of the present disclosure contains a crosslinking agent, the content thereof may be appropriately adjusted. For example, it may be 0.1 parts by mass to 20 parts by mass or 0.1 parts by mass to 10 parts by mass with respect to 100 parts by mass of the rubber component.

<Vulcanization Accelerator>

The vulcanization accelerator is not particularly limited and may be appropriately selected. Examples of the vulcanization accelerator include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compounds.

When the rubber composition of the present disclosure contains a vulcanization accelerator, the content thereof may be appropriately adjusted. For example, it may be 0.1 parts by mass to 20 parts by mass or 0.1 parts by mass to 10 parts by mass with respect to 100 parts by mass of the rubber component.

The method of preparing the rubber composition of the present disclosure is not particularly limited, and a known method may be used. For example, it may be obtained by kneading all the components including the modified conjugated diene-based polymer using a kneader such as a Banbury mixer, a roll, or an internal mixer. In addition, the rubber composition may be prepared by mixing the components other than the vulcanization accelerator and the crosslinking agent at a non-production stage and compounding and mixing the vulcanization accelerator and the crosslinking agent in the mixture at a production stage.

(Rubber Product)

A rubber product obtained by using the rubber composition of the present disclosure is not particularly limited, and examples thereof include a tire, a conveyor belt, an antivibration rubber, a seismic isolation rubber, a rubber crawler, hose, and foam.

The method of obtaining a rubber product using the rubber composition of the present disclosure is not particularly limited, and a known method may be used. The conditions for crosslinking or vulcanizing the rubber composition may be appropriately adjusted. For example, the temperature may be 120° C. to 200° C., and the heating time may be 1 minute to 900 minutes.

(Tire)

The tire of the present disclosure uses any one of the above-described rubber compositions. The rubber composition of the present disclosure may be used in any portion of the tire, and examples thereof include a tread rubber, a base tread rubber, a sidewall rubber, a side reinforcing rubber, and a bead filler.

The method of producing the tire is not particularly limited, and a known method may be used.

EXAMPLES

The present disclosure will now be described based on Examples, which are illustrative purposes only and shall not be construed as limiting the scope of the present disclosure.

Details of materials used in Examples are as follows.
Carbon black: N234 made by Tokai Carbon Co., Ltd.
Oil: JOMO PROCESS NC300BN made by JX Nippon Oil & Energy Corporation
Wax: product name SUNTIGHT® (SUNTIGHT is a registered trademark in Japan, other countries, or both) A made by Seiko-Chemical Co., Ltd.
Age resistor: N-(1,3-dimethylbutyl)-N'-phenyl-p-phenylenediamine, product name NOCRAC 6C made by Ouchi Shinko Chemical Industrial Co., Ltd.
Vulcanization accelerator: N-(cyclohexyl)-2-benzothiazole-sulfenamide, product name NOCCELER CZ-P made by Ouchi Shinko Chemical Industrial Co., Ltd.

In Examples, the energy for one non-covalent bond between the modifying groups of the modified conjugated diene-based polymer was determined with the method described above. In Examples, the vinyl bond content (expressed as Vi in the tables) [%] of the butadiene moiety and the styrene content (expressed as St in the tables) [%] of the polymer were determined from the integral ratio of $^1$H-NMR. The weight-average molecular weight of the polymer was determined with the method described above.

Comparative Example 1

Preparation of Unmodified SBR

Cyclohexane (240 g), a butadiene/cyclohexane solution (25 mass %, 216 g), and a styrene/cyclohexane solution (28 mass %, 22 g) were added to and mixed in an inert atmosphere glass bottle, and then a 2,2-di-(2-tetrahydrofuryl)propane/cyclohexane solution (1 M, 0.20 mL) and n-butyllithium (1.6 M, 0.4 mL) were added to the glass bottle. The glass bottle was gently shaken at 50° C. for two hours, and then an appropriate amount of deaerated isopropanol was added to terminate the polymerization. The obtained polymer cement was reprecipitated with isopropanol and added with 0.5 mL of an isopropanol solution of 2,6-di-t-butyl-p-cresol (BHT) (BHT concentration: 5 mass %), and then it was dried under reduced pressure to obtain an unmodified styrene-butadiene copolymer (unmodified SBR).

Comparative Example 2

Preparation of Unmodified SBR

Cyclohexane (240 g), a butadiene/cyclohexane solution (25 mass %, 194 g), and a styrene/cyclohexane solution (27 mass %, 46 g) were added to and mixed in an inert atmosphere glass bottle, and then a 2,2-di-(2-tetrahydrofuryl)propane/cyclohexane solution (1 M, 0.35 mL) and n-butyllithium (1.6 M, 0.32 mL) were added to the glass bottle. The glass bottle was gently shaken at 50° C. for one hour, and then an appropriate amount of deaerated isopropanol was added to terminate the polymerization. The obtained polymer cement was reprecipitated with isopropanol and added with 0.5 mL of an isopropanol solution of 2,6-di-t-butyl-p-cresol (BHT) (BHT concentration: 5 mass %), and then it was dried under reduced pressure to obtain an unmodified styrene-butadiene copolymer (unmodified SBR).

Example 1

Preparation of COOLi Modified SBR (Low Modification Rate)

In the step (i), cyclohexane (240 g), a butadiene/cyclohexane solution (25 mass %, 194 g), a styrene/cyclohexane solution (27 mass %, 46 g), and 4-methylstyrene (480 mg) were added to and mixed in an inert atmosphere glass bottle, and then a 2,2-di-(2-tetrahydrofuryl)propane/cyclohexane solution (1 M, 0.35 mL) and n-butyllithium (1.6 M, 0.32 mL) were added to the glass bottle. The glass bottle was gently shaken at 50° C. for one hour and the polymerization was completed. The formation of a conjugated diene-based polymer was confirmed.

In the step (ii), N,N,N',N'-tetramethylethylenediamine (418 mg) and sec-butyllithium (1.0 M, 4.0 mL) were added to the solution containing the conjugated diene-based polymer obtained in the step (i), and the solution was shaken at 70° C. for two hours.

In the step (iii), carbon dioxide gas was blown into the solution obtained in the step (ii) until the color disappeared to complete the modification reaction.

Subsequently, 0.5 mL of an isopropanol solution of 2,6-di-t-butyl-p-cresol (BHT) (BHT concentration: 5 mass %) was added to the obtained polymer cement, and then it was reprecipitated with isopropanol and dried under reduced pressure to obtain the desired modified styrene-butadiene copolymer with low modification rate.

Example 2

In Example 2, anionic polymerization and modification reaction were performed in the same manner as in Example 1 except that the addition amount of 4-methylstyrene was 960 mg and the addition amount of sec-butyllithium was 1.0 M and 8.0 mL. A modified styrene-butadiene copolymer with high modification rate was obtained.

Example 3

In Example 3, anionic polymerization and modification reaction were performed in the same manner as in Example 1 except that the addition amount of 4-methylstyrene was 71 mg and the addition amount of sec-butyllithium was 1 M and 0.54 mL. A modified styrene-butadiene copolymer with low modification rate was obtained.

Example 4

In Example 4, anionic polymerization and modification reaction were performed in the same manner as in Example 1 except that the addition amount of 4-methylstyrene was 213 mg and the addition amount of sec-butyllithium was 1 M and 1.6 mL. A modified styrene-butadiene copolymer with medium modification rate was obtained.

Example 5

In Example 5, anionic polymerization and modification reaction were performed in the same manner as in Example 1 except that the addition amount of 4-methylstyrene was 425 mg and the addition amount of sec-butyllithium was 1.0 M and 3.2 mL. A modified styrene-butadiene copolymer with high modification rate was obtained.

(Preparation of Pure Rubber Composition)

The unmodified SBR obtained in Comparative Example 1 and the modified SBRs obtained in Examples 1 and 2 were used as rubber components. Each of the rubber components of Comparative Example 1 and Examples 1 and 2 was used to prepare a pure rubber composition (a rubber composition containing no filler) in the following composition.
Rubber component: 100 phr
Age resistor: 1 phr
Wax: 1 phr
Zinc oxide: 3 phr
Vulcanization accelerator: 1.5 phr
Sulfur: 1.5 phr The pure rubber composition was vulcanized at 160° C. for 20 minutes to obtain a pure rubber vulcanizate, and the pure rubber vulcanizate was subjected to the following low loss property evaluation. In addition, each pure rubber vulcanizate was evaluated in terms of crack growth resistance, which was an evaluation of durability. The results are listed in Table 1.

TABLE 1

| | | Pure rubber composition | | |
|---|---|---|---|---|
| | | Comparative Example 1 | Example 1 | Example 2 |
| Polymer | Number of modifying groups in one polymer molecule | 0 | 11 | 22 |
| | Type of modifying group | — | —COOLi | —COOLi |
| | Energy of non-covalent bond between modifying groups (kJ/mol) | — | 195 | 195 |
| | Weight-average molecular weight Mw [kDa] | 154 | 155 | 155 |
| | St [%] | 11 | 11 | 10 |
| | Vi [%] | 49 | 50 | 48 |
| Property | Low loss property | 100 | 109 | 126 |
| | Crack growth resistance | 100 | 1637 | 4308 |

<Evaluation of Low Loss Property>

Loss tangent (tan δ) was measured at a temperature of 50° C., a frequency of 15 Hz, and a strain of 10% using a viscoelasticity meter made by TA Instruments. The result was the reciprocal of the value of the tan δ and was indicated in an index taking the value of Comparative Example 1 as 100. A large index indicates that it is excellent in low loss property.

<Crack Growth Resistance>

A 0.5 mm crack was made at the center of a JIS No. 3 test piece, and the test piece was repeatedly strained to a certain degree of 40% to 150% at room temperature to be fatigued. The number of times until the sample was cut was measured. The result is indicated in an index taking the value of Comparative Example 1 as 100. A large index indicates that it is excellent in crack growth resistance (durability).

(Preparation of Filler-Containing Rubber Composition)

The unmodified SBR obtained in Comparative Example 2 and the modified SBRs obtained in Examples 3 to 5 were used as rubber components. Each of the rubber components of Comparative Example 2 and Examples 3 to 5 was used to prepare a filler-containing rubber composition in the following composition.
Rubber component: 100 phr
Carbon black: 50 phr
Oil: 10 phr
Age resistor: 1 phr
Wax: 1 phr
Zinc oxide: 3 phr
Vulcanization accelerator: 1.5 phr
Sulfur: 1.5 phr The filler-containing rubber composition was vulcanized at 160° C. for 20 minutes to obtain a filler-containing rubber vulcanizate. The filler-containing rubber vulcanizate was subjected to low loss property and crack growth resistance evaluations in the same manner as for the pure rubber vulcanizate. In addition, the filler-containing rubber vulcanizate was subjected to the following wet gripping performance evaluation. The result is indicated in an index taking the value of Comparative Example 2 as 100. The results are listed in Table 2.

<Wet Gripping Performance>

The resistance value of a test piece of the vulcanized rubber against a wet concrete road surface was measured using a British Portable Skid Tester. The result is indicated in an index taking the value of Comparative Example 2 as 100. A large index indicates a large resistance value, meaning that it is good in wet gripping performance.

TABLE 2

|  |  | Filler-containing | | | |
|---|---|---|---|---|---|
|  |  | Comparative Example 2 | Example 3 | Example 4 | Example 5 |
| Polymer | Number of modifying groups in one polymer molecule | 0 | 2 | 5 | 13 |
|  | Type of modifying group | — | —COOLi | —COOLi | —COOLi |
|  | Energy of non-covalent bond between modifying groups (kJ/mol) | — | 195 | 195 | 195 |
|  | Weight-average molecular weight Mw [kDa] | 191 | 192 | 196 | 189 |
|  | St [%] | 20 | 19 | 19 | 19 |
|  | Vi [%] | 64 | 64 | 64 | 64 |
| Property | Low loss property | 100 | 110 | 120 | 125 |
|  | Crack growth resistance | 100 | 118 | 140 | 140 |
|  | Wet gripping performance | 100 | 102 | 104 | 106 |

As indicated in Table 1, in the case of pure rubber composition, the Examples are excellent in low loss property and crack growth resistance (durability). Particularly, it is understood that, when the modification rate of the modified conjugated diene-based polymer increases, the crack growth resistance is remarkably improved in the Examples. As indicated in Table 2, in the case of filler-containing rubber composition, the Examples are excellent in low loss property and crack growth resistance (durability). Further, in the case of filler-containing rubber composition, the wet gripping performance is improved in the Examples as compared with the Comparative Example.

INDUSTRIAL APPLICABILITY

According to the present disclosure, it is possible to provide a modified conjugated diene-based polymer with excellent low loss property and durability. In addition, it is possible to provide a rubber composition with excellent low loss property and durability. Further, it is possible to provide a tire with excellent low loss property and durability. Moreover, it is possible to provide a method of producing a modified conjugated diene-based polymer, which can produce a modified conjugated diene-based polymer with excellent low loss property and durability.

The invention claimed is:

1. A modified conjugated diene-based polymer having 3 to 30 modifying groups in one molecule of the modified conjugated diene-based polymer, wherein the modifying groups between molecules have a non-covalent bond, and energy for one non-covalent bond is 10 kJ/mol to 250 kJ/mol;

wherein the modifying group is at least one selected from the group consisting of —COOM and —OM, and M is an alkali metal atom; and wherein the modified conjugated diene-based polymer has a weight-average molecular weight of 100,000 or more.

2. The modified conjugated diene-based polymer according to claim 1, wherein the modifying group is at least one selected from the group consisting of —COOLi and —OLi.

3. The modified conjugated diene-based polymer according to claim 1, wherein the modified conjugated diene-based polymer is at least one selected from the group consisting of a modified styrene-butadiene copolymer and a modified polybutadiene.

4. A rubber composition comprising the modified conjugated diene-based polymer according to claim 1.

5. The rubber composition according to claim 4, further comprising a filler.

6. A tire using the rubber composition according to claim 4.

7. A method of producing the modified conjugated diene-based polymer of claim 1, the method comprising:

(i) anionically polymerizing a conjugated diene compound alone or a conjugated diene compound and an aromatic vinyl compound in presence of an alkali metal compound as a polymerization initiator to form a conjugated diene-based polymer, (ii) further adding an alkali metal compound to the conjugated diene-based polymer after (i) to obtain a product, and (iii) reacting the product obtained in (ii) with a modifying agent to introduce a modifying group into the conjugated diene-based polymer.

8. The method of producing a modified conjugated diene-based polymer according to claim 7, wherein the aromatic vinyl compound includes styrene and at least one selected from the group consisting of alkylstyrene and halogenated alkylstyrene.

9. The method of producing a modified conjugated diene-based polymer according to claim 8, wherein a total content of the at least one selected from the group consisting of alkylstyrene and halogenated alkylstyrene is 0.1 mass % to 3 mass % with respect to a monomer forming the conjugated diene-based polymer.

10. The method of producing a modified conjugated diene-based polymer according to claim 8, wherein the alkylstyrene is 4-methylstyrene, and the halogenated alkylstyrene is 4-chloromethyl styrene.

11. The method of producing a modified conjugated diene-based polymer according to claim 7, wherein the modifying agent is carbon dioxide.

12. The method of producing a modified conjugated diene-based polymer according to claim 8, wherein the modifying agent is carbon dioxide.

13. The modified conjugated diene-based polymer according to claim 2, wherein the modified conjugated diene-based polymer is at least one selected from the group consisting of a modified styrene-butadiene copolymer and a modified polybutadiene.

* * * * *